US010210777B2

(12) United States Patent
Carter (10) Patent No.: US 10,210,777 B2
(45) Date of Patent: Feb. 19, 2019

(54) METHOD AND APPARATUS FOR ADVERTISING ADJACENT TO AN ELECTRONIC VISUAL DISPLAY (71) Applicant: Innovative Point of Sale Systems, LLC, Eagle, ID (US)

(72) Inventor: William Jonathan Carter, Eagle, ID (US)

(73) Assignee: INNOVATIVE POINT OF SALE SYSTEMS, LLC, Boise, ID (US)

(*) Notice: Subject to any disclaimer, the term of this patent is extended or adjusted under 35 U.S.C. 154(b) by 165 days.

(21) Appl. No.: 15/195,531

(22) Filed: Jun. 28, 2016

(65) Prior Publication Data
US 2017/0004744 A1 Jan. 5, 2017

Related U.S. Application Data (60) Provisional application No. 62/187,076, filed on Jun. 30, 2015.

(51) Int. Cl.
G09F 7/18 (2006.01)
G09F 15/00 (2006.01)
F16B 5/07 (2006.01)
F16B 7/22 (2006.01)

(52) U.S. Cl.
CPC ............ *G09F 7/18* (2013.01); *G09F 15/0018* (2013.01); *F16B 5/07* (2013.01); *F16B 7/22* (2013.01); *G09F 2007/1847* (2013.01)

(58) Field of Classification Search
CPC ............. G09F 7/18; G09F 15/0018; G09F 2007/1847; F16B 7/22; F16B 5/07
See application file for complete search history.

(56) References Cited

U.S. PATENT DOCUMENTS

| 5,655,833 A * | 8/1997 | Raczynski | F21S 6/002 248/125.3 |
| 5,901,937 A * | 5/1999 | Compeau | A47B 21/045 248/205.1 |
| 6,817,128 B2 * | 11/2004 | Korpai | G06F 1/1607 40/725 |
| 2008/0019087 A1 * | 1/2008 | Chen | G06F 1/1605 361/679.07 |
| 2015/0027016 A1 * | 1/2015 | Best | G09F 9/30 40/711 |
| 2016/0225297 A1 * | 8/2016 | Walker | G09F 15/0012 |

FOREIGN PATENT DOCUMENTS

GB 2507537 5/2014

OTHER PUBLICATIONS

Canadian Intellectual Property Office; Office Action; Canadian Patent Application Serial No. 2,934,546 dated Jul. 14, 2017.

* cited by examiner

Primary Examiner — Jun S Yoo
(74) Attorney, Agent, or Firm — Parsons Behle & Latimer (57) ABSTRACT A method of advertising is disclosed. The method includes detachably coupling a first advertising article to a first mount coupled to an electronic visual display device located in a commercial establishment. When the first advertising article is detachably coupled to the electronic visual display device, the first advertising article is adjacent to the electronic visual display device.

18 Claims, 4 Drawing Sheets

METHOD AND APPARATUS FOR ADVERTISING ADJACENT TO AN ELECTRONIC VISUAL DISPLAY

FIELD

The present disclosure relates generally to advertising and, more particularly, to a method and apparatus for advertising adjacent to an electronic visual display.

BACKGROUND

Marketing is a crucial part of the alcohol supply chain. To maintain market share, companies invest heavily in marketing and promotion. To increase market share, advertising and promotion are used to encourage consumers to switch brands. Marketing creates brands and brand image. Many bars (e.g., sports bars), taverns, brew pubs, and restaurants place multiple televisions throughout their establishment to broadcast sporting events such as NCAA and NFL football, NCAA and NBA basketball, Major League baseball, PGA golf, soccer matches, boxing matches, NASCAR auto races, etc. Alcohol producers as well as bars (e.g., sports bars), taverns, brew pubs, and restaurants also promote alcohol consumption tied to various holidays, such as Cinco De Mayo, St. Patrick's Day, New Year's Eve, Fourth of July, etc. The broadcast content displayed on the televisions situated in bars (e.g., sports bars), taverns, brew pubs, and restaurants attracts patrons to the establishment and these patrons typically purchase food and drink from the establishment during the course of watching the broadcast content. Thus, televisions serve to increase the food and beverage revenue generated by the establishment. However, conventional forms of brand promotion in bars (e.g., sports bars), taverns, brew pubs, and restaurants cannot offer brand advertisers sustained exposure to consumers for the duration of the broadcast content (e.g., a sporting event) displayed on the televisions.

For instance, current methods of advertising include point-of-sale advertising delivered by commercials broadcast on the televisions during "commercial" or "television" time outs. These commercials aired during the commercial breaks of a broadcast sporting event are designed to drive sales of a particular brand of alcoholic beverage. However, broadcast commercial advertisements are inefficient in driving sales because patrons of bars (e.g., sports bars), taverns, brew pubs, and restaurants commonly avert their eyes from the television during the commercial breaks, such as to use the restroom, to order food, and/or to speak with their friends.

Additionally, bars, taverns, brew pubs, and restaurants commonly utilize other forms of advertisements, but none of them are optimally placed to deliver a sustained advertising message. For example, drink coasters that contain advertising for a particular brand of beverage (e.g., a product name and/or logo for an alcoholic beverage) are delivered by the wait staff after the consumer has selected a beverage from the menu. Additionally, the advertising content on the coaster is obstructed when the customer places a drink on the coaster. Accordingly, coasters may be of limited efficacy in driving sales of the particular brand of beverage advertised on the coaster. Furthermore, exclusivity for a particular brand is generally not feasible with drink coaster advertising.

Walls signs are another form of advertising in bars, taverns, brew pubs, and restaurants. Wall signs (e.g., neon signs and posters) in a commercial establishment are not typically located with sufficient proximity to the televisions to be noticed by customers watching broadcast content (e.g., a sporting event) on the television. Additionally, many commercial establishments utilize dim lighting for ambiance and/or to aid in viewing the broadcast content on the televisions, which renders the wall signs ineffective in driving sales of the products advertised on the wall signs. Furthermore, many establishments may not utilize wall signs because they clash with interior decor and/or because the internal decor is not conducive to hanging wall signs. Furthermore, commercial establishments that utilize neon signs to advertise often display multiple neon signs. Accordingly, neon signs tend to become "background noise" for consumers such that no single neon sign stands out from the group of neon signs. Additionally, generally, no single brand can obtain exclusivity in advertising with neon signs in a commercial establishment.

Additionally, brand and/or product advertising on a server's shirt may not be possible at commercial establishments that require their employees to dress in a specific manner (e.g., adhere to a particular dress code). Other commercial establishments may permit their servers to choose what they wear as long as it falls within their general dress code guidelines, and therefore there is no guarantee that the servers will wear a shirt or other item of clothing bearing a specific brand.

Furthermore, brand advertising on a server's clothing is subject to competition between brands.

Furthermore, commercial establishments generally include menus and other tabletop displays (e.g., "table talkers" or "table tents") advertising particular brands or special promotions. However, menus usually display products by name and price without any distinctive logo, advertising, or promotional or image messaging. Thus, there is nothing in the menu that compels a consumer to select a product he/she has never tried before. Additionally, "table talkers" or "table tents" are typically small, relatively hard to see where more than one person is sitting at a table, and it is difficult for a brand to secure exclusivity.

BRIEF DESCRIPTION OF THE DRAWINGS

The features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various apparatuses and methods of advertising in a space adjacent to an electronic visual display device (e.g., a television) in a commercial establishment (e.g., a bar, restaurant, nightclub, a tavern, a brew pub, or a lounge) by coupling one or more advertising articles to the electronic visual display device. The advertising method according to various embodiments of the present disclosure is configured to facilitate advertising during the broadcast of a program (e.g., during the broadcast of a sporting event) displayed on the electronic visual display. Accordingly, the advertising methods of the present disclosure, unlike conventional broadcast commercial advertising, are not limited to advertising during a commercial break from the broadcast program. The advertising article may contain any suitable type or kind of advertising material, such as, for instance, promotional offers, new product promotions, promotion of a particular brand of a product sold in the commercial establishment, and/or promotion of a brand in conjunction with a holiday (e.g., Cinco De Mayo). Locating the advertising article adjacent to the electronic visual display is configured to draw a viewer's attention to the advertising content on the advertising article while watching a broadcast program on the electronic visual display device. Coupling one or more advertising articles to the electronic visual display such that the advertising article is adjacent to the electronic visual display offers brand advertisers sustained exposure to consumers for the entire duration of the broad program (e.g., a sporting event) because the broadcast content displayed on the electronic visual display draws the patrons' eyes to the electronic visual display and the advertising article coupled thereto. Accordingly, depending on the nature of the advertising content displayed on the advertising article, the advertising methods of the present disclosure may be configured to increase the sale of products sold by the commercial establishment in which the electronic visual display device and the one or more advertising articles are located. Furthermore, the advertising articles of the present disclosure may be any suitable type or kind of display, such as a fixed, static display or an electronic display configured to dynamically display advertising content. Accordingly, the apparatuses and methods of the present disclosure facilitate constantly advertising to patrons during the broadcast of content (e.g., a sporting event) on the electronic visual display device, whereas conventional forms of advertising, such as posters, table talkers, table tents, neon signs, coasters, or other forms of point-of-sale promotion are not viewed by patrons while watching broadcast content on the electronic visual display device. Thus, the advertiser utilizing the apparatuses and/or methods of the present disclosure achieves maximum exposure and visibility to consumers watching a broadcast program in a commercial establishment.

Figure 1A:
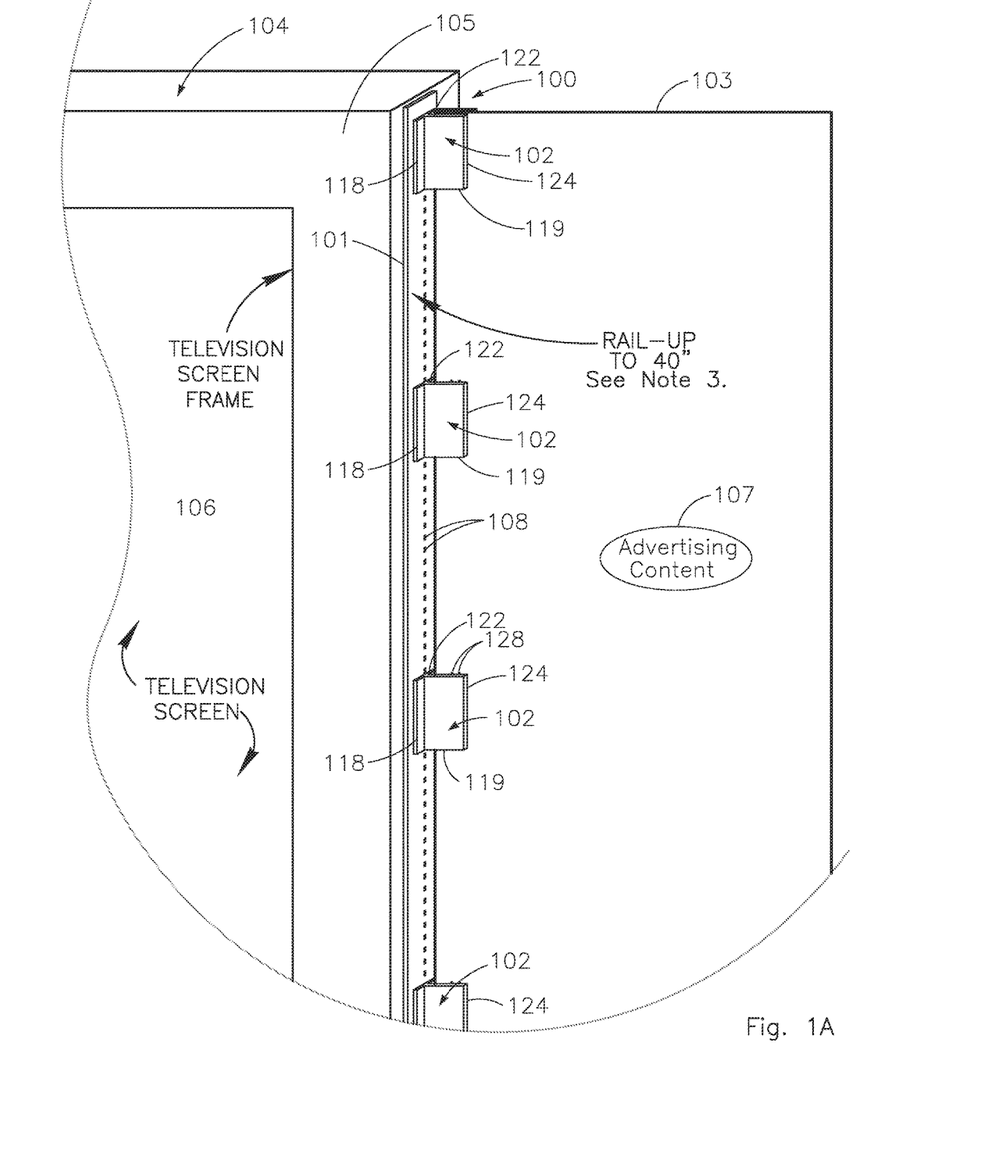
FIG. 1A is a perspective view of an attachment assembly according to one embodiment of the present disclosure shown coupling an advertising article to a television.

With reference now to FIG. 1A, an attachment assembly 100 according to one embodiment of the present disclosure includes a rail 101 and a plurality of mounts 102 configured to detachably engage the rail 101. In the illustrated embodiment, the attachment assembly 100 is shown detachably coupling an advertising article 103 to an electronic visual display device 104 (e.g., a television). In the illustrated embodiment, the rail 101 is shown coupled a side (or a portion thereof) of a frame 105 extending around a periphery of a display area 106 of the electronic visual display device 104, the mounts 102 are detachably coupled to the rail 101, and the advertising article 103 is coupled to the mounts 102. Additional attachment assemblies 100 may be used to detachably couple one or more additional advertising articles to one or more other sides of the frame 105 of the electronic visual display device 104. Accordingly, one or more attachment assemblies 100 may be used to detachably couple one or more advertising articles to any or all sides of the electronic visual display device 104.

Although in the illustrated embodiment the attachment assembly 100 includes four mounts 102, in one or more embodiments the attachment assembly 100 may include any other suitable number of mounts 102 depending, for instance, on the size and weight of the advertising article and/or the number of advertising articles that are intended to be detachably coupled to the mounts. For instance, in one or more embodiments, the attachment assembly 100 may include from one to ten mounts 102.

The electronic visual display device 104 to which the advertising article 103 is coupled by the attachment assembly 100 may be present in any suitable commercial establishment, such as, for instance, a bar (e.g., a sports bar), a tavern, a brew pub, or restaurant, nightclub, or a lounge. The advertising article 103 contains advertising content 107 (e.g., a product name and/or a logo) advertising for a particular company, a particular brand, and/or a particular product. For instance, in one or more embodiments, the advertising content 107 on the advertising article 103 may include a logo and/or a product name for an alcoholic beverage. Although in the illustrated embodiment the advertising content 107 on the advertising article 103 is static (e.g., a printed image), in one or more embodiments the advertising article 103 may be configured to dynamically display the advertising content 107 (e.g., the advertising article 103 may be an electronic display configured to change the advertising content displayed on the advertising article 103 and/or the advertising article 103 may be an electronic display configured to display video advertising content). Additionally, in one or more embodiments, the advertising content 107 on the advertising article 103 may be related to a product sold by the establishment in which the electronic visual display device 104 is located such that the advertising article 103 is designed to increase sales of the product offered for sale by the establishment. In one or more alternate embodiments, the advertising content 107 on the advertising article 103 may be unrelated to a product sold by the establishment in which the electronic visual display device 104 is located. The advertising article 103 may be made out of any suitable rigid and durable material, such as, for instance, paper, plastic, laminate, or combinations thereof.

In the illustrated embodiment, when the advertising article 103 is detachably coupled to the electronic visual display device 104 by the attachment assembly 100, the advertising article 103 (or a portion thereof) is parallel or substantially parallel with the display area 106 of the electronic visual display device 104. In one or more embodiments, when the advertising article 103 is detachably coupled to the television by the attachment assembly 100, the advertising article 103 (or a portion thereof) may be co-planar or substantially co-planar with the display area 106 of the electronic visual display device 104. In one or more embodiments, the advertising article 103 may be parallel or substantially parallel with the display area 106 of the electronic visual display device 104 but the advertising article 103 may be non-planar with the display area 106 (i.e., the advertising article 103 may be offset from the display area 106 of the electronic visual display device 104). For instance, the advertising article 103 may be parallel or substantially parallel with the display area 106 of the electronic visual display device 104 and may be recessed or project in front of the display area 106 of the electronic visual display device 104. Additionally, in one or more alternate embodiments, when the advertising article 103 is detachably coupled to the electronic visual display device 104 by the attachment assembly 100, the advertising article 103 (or a portion thereof) may not be parallel with the display area 106 of the electronic visual display device 104 (e.g., the advertising article 103 may be canted forward or rearward relative to the display area 106 of the electronic visual display device 104). Additionally, although in the illustrated embodiment the advertising article 103 is a planar or substantially planar member, in one or more alternate embodiments the advertising article 103 may be non-planar or may have one or more non-planar features.

Figure 1B:
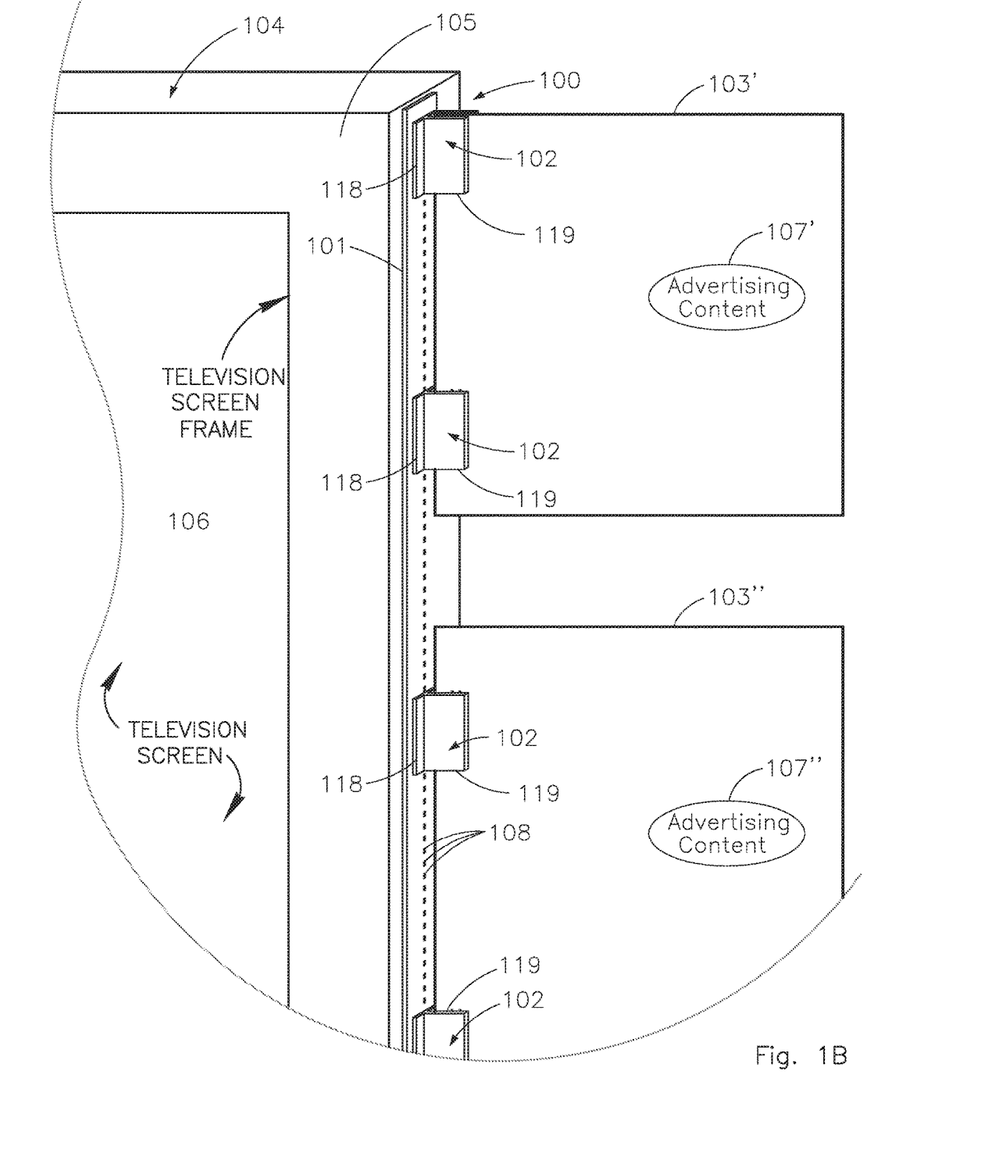
FIG. 1B is a perspective view of the embodiment of the attachment assembly illustrated in FIG. 1A shown coupling two advertising articles to a television.

FIG. 1B illustrates the attachment assembly 100 according to one embodiment of the present disclosure detachably coupling two advertising articles 103', 103" to the side (or a portion thereof) of the frame 105 of the electronic visual display device 104. In one or more embodiments, advertising content 107' contained on one of the advertising articles 103' may be different from advertising content 107" on the other advertising article 103". In one or more embodiments, the advertising content 107', 107" on each of the advertising articles 103', 103" may be related to a product sold by the establishment in which the electronic visual display device 104, the attachment assembly 100, and the advertising articles 103', 103" are located. For instance, the advertising content 107' on one of the advertising articles 103' may be related to a brand of alcoholic beverage sold by the establishment and the advertising content 103" on the other advertising article 107" may be related to a promotional offer for food sold by the establishment. Additionally, although in the illustrated embodiment the two advertising articles 103', 103" have the same orientation relative to the display area 107 of the electronic visual display device 104, in one or more alternate embodiments, the two advertising articles 103', 103" may have different orientations (e.g., one of the advertising articles 103' may be parallel to the display area 107 of the electronic visual display device 104 and the other advertising article 103" may be canted relative to the display area 107 of the electronic visual display device 104).

Figures 2A, 2B:
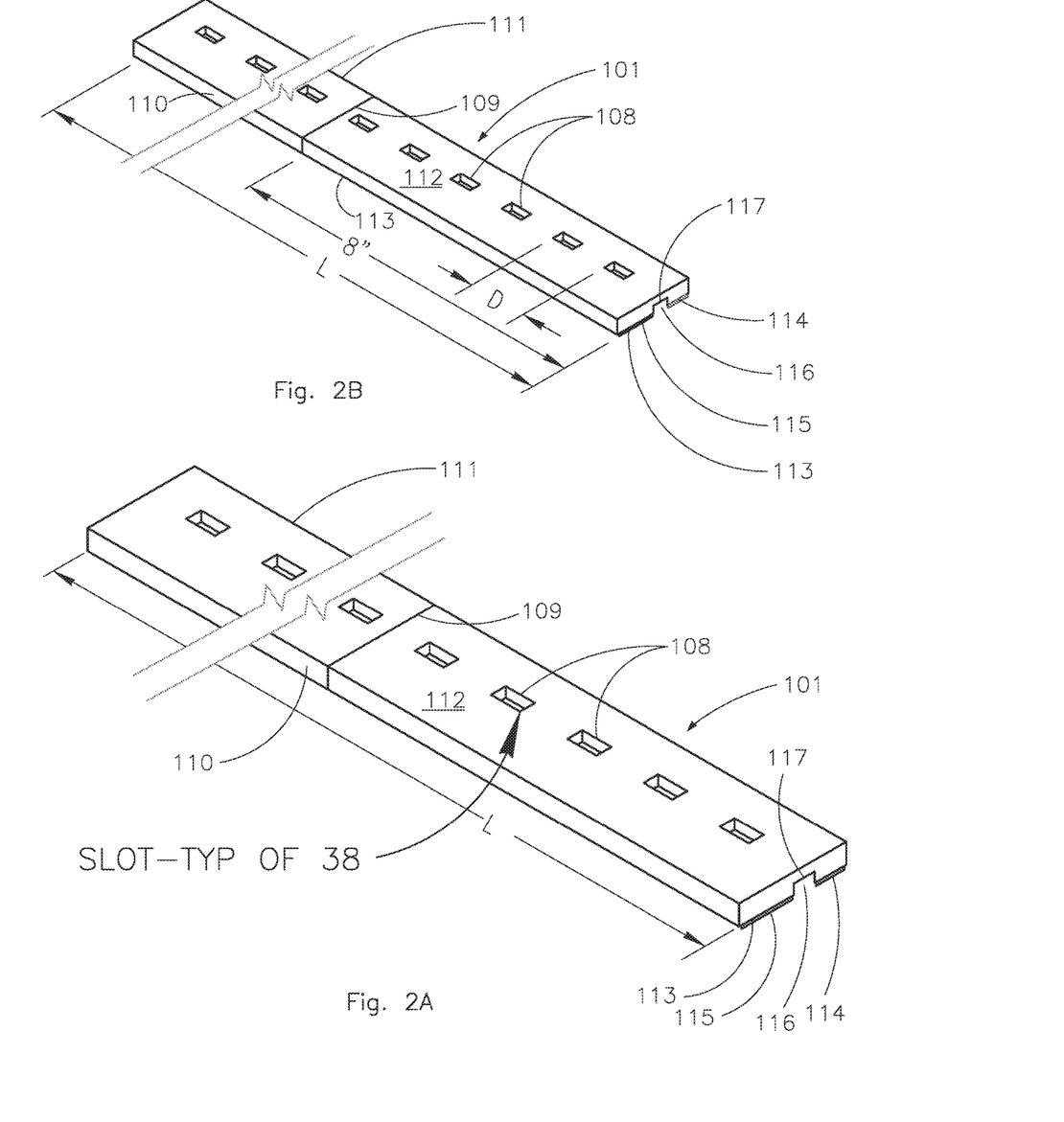
FIGS. 2A and 2B are a perspective view and a detail view, respectively, of a rail according to one embodiment of the present disclosure.

With reference now to the embodiment illustrated in FIGS. 2A and 2B, the rail 101 is an elongate, generally rectangular member. The rail 101 defines a series of spaced apart openings 108 (e.g., slots) extending along at least a portion of a length L of the rail 101. Although in the illustrated embodiment the openings 108 are rectangular slots, in one or more alternate embodiments, the openings 108 may have any other suitable shape, such as, for instance, square or oval. The openings 108 in the rail 101 define attachment points for the mounts 102 (i.e., the mounts 102 may be detachably coupled to the desired openings 108 in the rail 101 depending, for instance, on the desired positioning of the advertising article 103). Additionally, in the illustrated embodiment, adjacent openings 108 are spaced apart by a distance D of approximately 1 inch (i.e., the openings 108 have a pitch of approximately 1 inch). In one or more embodiments, adjacent openings 108 may be spaced apart by any other suitable distance D, such as, for instance, greater than approximately 1 inch or less than approximately 1 inch, depending on the desired increments at which the mounts 102 may be positioned along the length L of the rail 101. Although in the illustrated embodiment the openings 108 are regularly spaced along the rail 101 (i.e., the openings 108 may be spaced apart by a constant interval), in one or more embodiments the openings 108 may be irregularly spaced along the rail 101 (i.e., the openings 108 may be spaced at irregular intervals).

Additionally, in the illustrated example embodiment, the rail 101 may also define a series of break lines 109 (e.g., score lines or perforations) extending transversely across the rail 101 between opposite sides 110, 111 of the rail 101. The break lines 109 are configured to facilitate breaking the rail 101 to the desired length L based, for instance, on the size of the electronic visual display device 104 to which the attachment assembly 100 is intended to be attached. For instance, in one or more embodiments, the rail 101 may be broken along one of the break lines 109 such that the length L of the rail 101 is substantially the same length as the side of the frame 105 of the electronic visual display device 104 to which the rail 101 is intended to be coupled. In one or more embodiments, the rail 101 may be broken along one of the break lines 109 such that the length L of the rail 101 is shorter than the side of the frame 105 of the electronic visual display device 104 to which the rail 101 is intended to be coupled. In one or more embodiments, the rail 101 may be broken along one of the break lines 109 such that the length L of the rail 101 is longer than the side of the frame 105 of the electronic visual display device 104 to which the rail 101 is intended to be coupled. In the illustrated embodiment, adjacent break lines 109 are spaced apart by a distance of approximately 8 inches. In one or more embodiments, adjacent break lines 109 may be spaced apart by any other suitable distance, such as, for instance, from approximately 1 inch to approximately 12 inches, depending on the desired increment at which the length L of the rail 101 may be adjusted.

Still referring to the embodiment illustrated in FIGS. 2A and 2B, the rail 101 includes an outer surface 112 and an inner surface 113 opposite the outer surface 112. In the illustrated embodiment, the rail 101 includes a layer of adhesive 114 on the inner surface 113. The layer of adhesive 114 is configured to facilitate attachment of the rail 101 to the electronic visual display device 104 (e.g., to the side of the frame 105 extending around the display area 107 of the electronic visual display device 104). The layer of adhesive 114 may include any suitable type of adhesive, such as, for instance, a pressure-sensitive adhesive. In one embodiment, the layer of adhesive 114 may be double-sided tape. In one or more embodiments, the rail 101 may include a removable protective film layer 115 covering the adhesive layer 114 to protect the layer of adhesive 114 prior to attaching the rail 101 to the electronic visual display device 104. The protective film layer 115 may be removed to expose the adhesive layer 114 prior to adhering the rail 101 to the electronic visual display device 104. In one or more alternate embodiments, the rail 101 may include any other suitable mechanism configured to couple the rail 101 to the electronic visual display device 104, such as, for instance, one or more hook or loop-type fasteners (e.g., hook or loop-type fasteners sold under the trade name Velcro ™).

Additionally, in the illustrated embodiment, the rail 101 may also define a groove or channel 116 extending along the length L of the rail 101, the significance of which is described below. The groove 116 extends outward from the inner surface 113 of the rail 101. In the illustrated embodiment, the groove 116 is aligned with the openings 108 in the rail 101 (e.g., the groove 116 extends below the openings 108 in the rail 101). Additionally, although in the illustrated embodiment the groove 116 has a rectangular cross-sectional shape, in one or more embodiments, the groove 116 may have any other suitable cross-sectional shape, such as, for instance, square or semi-circular. Moreover, although in the illustrated embodiment the groove 116 has a width substantially equal to a width of the openings 108, in one or more embodiments, the width of the groove 116 may be different than the width of the openings 108 (e.g., the groove 116 may be wider or narrower than the width of the openings 108). Although in the illustrated embodiment the groove 116 extends continuously along the length L of the rail 101, in one or more alternate embodiments, the rail 101 may define a series of discontinuous channel segments corresponding in number to the number of openings 108 defined in the rail 101. Accordingly, due to the groove 116, the sides 110, 111 of the rail 101 are thicker than an intermediate portion 117 of the rail 101 along which the groove 116 extends.

Figure 3A:
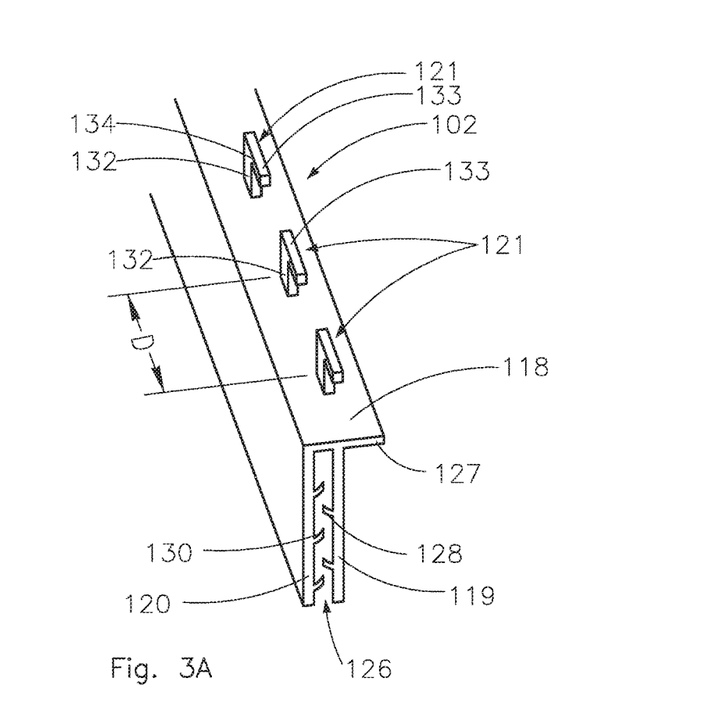
FIGS. 3A and 3B are perspective views of a mount according to one embodiment of the present disclosure.
Figure 3B:
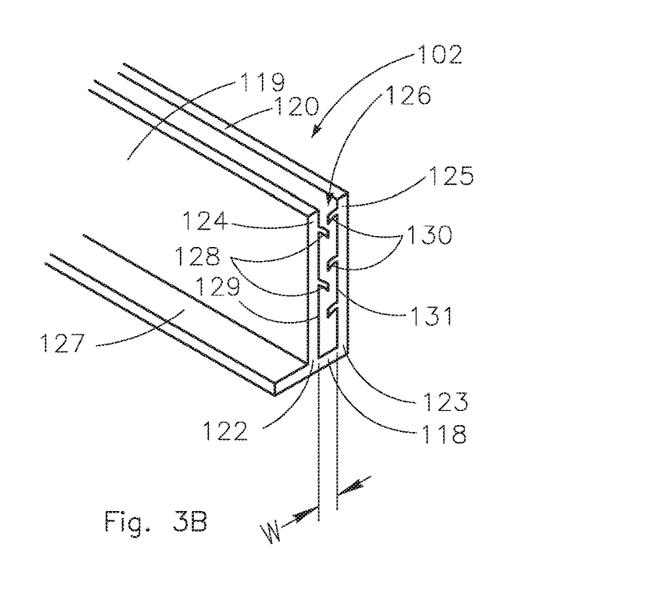

With reference now to FIGS. 3A and 3B, each of the mounts 102 according to one embodiment of the present disclosure includes a base wall 118, a pair of arms 119, 120 extending from the base wall 118 in a first direction (e.g., outward), and a series of spaced apart hooks 121 extending from the base wall 118 in a second direction (e.g., inward) opposite the first direction. Each of the arms 119, 120 includes an inner end 122, 123 coupled to the base wall 118 and an outer free end 124, 125 opposite the inner end 122, 123, respectively. In the illustrated embodiment, the arms 119, 120 are parallel or substantially parallel to each other. Additionally, in the illustrated embodiment, the arms 119, 120 are planar members (e.g., flat plate members), in one or more embodiments, the arms 119, 120 may be non-planar (e.g., the arms 119, 120 may be curved). In one or more alternate embodiments, the arms 119, 120 may taper toward each other (e.g., the arms 119, 120 may taper toward each other in a direction from the inner ends 122, 123 to the outer free ends 124, 125). A channel 126 configured to receive and accept a portion of the advertising article 103 is defined between the arms 119, 120 and the base wall 118. In the illustrated embodiment, a width W of the channel 126 is equal or substantially to a thickness of the advertising article 103. In one or more embodiments, the width W of the channel 126 may be slightly larger or slightly smaller than the thickness of the advertising article 103. For instance, the advertising article 103 may be made of a deformable material (e.g., paper) such that a portion of the advertising article 103 may be slightly compressed when it is received between the arms 119, 120 of the mount 102. Although in the illustrated embodiment the width W of the channel 126 is constant or substantially constant, in one embodiment in which the arms 119, 120 taper toward each other, the width W of the channel 126 tapers.

Additionally, in the illustrated embodiment, the base wall 118 of the mount 102 extends or projects beyond the inner end 122 of one of the arms 119 of the mount 102 and is flush or substantially flush with the inner end 123 of the other arm 120. A portion 127 of the base wall 118 that projects beyond one or both of the arms 119 is configured to provide stability to the mount 102 when it is detachably coupled to the rail 101. In one or more alternate embodiments, the base wall 118 may be flush and or substantially flush with the inner ends 122, 123 of both of the arms 119, 120 of the mount 102 or the base wall 118 may extend or project beyond the inner ends 122, 123 of both of the arms 119, 120.

Additionally, in the illustrated embodiments, the mount 102 includes a first series of teeth 128 coupled to an inner surface 129 of one of the arms 119 and extending into the channel 126 and a second series of teeth 130 coupled to an inner surface 131 of the other arm 120 and extending into the channel 126. In the illustrated embodiment, the teeth 128 on one of the arms 119 are staggered relative to the teeth 130 on the other arm 120. In one or more alternate embodiments, the teeth 128 on one of the arms 119 may be aligned or substantially aligned with the teeth 130 on the other arm 120. The teeth 128, 130 may either extend continuously along the length of the arms 119, 120 or the teeth 128, 130 may be located discontinuously along the length of the arms 119, 120. Additionally, in the illustrated embodiment, the teeth 128, 130 extend at least half way across the channel 126 such that the teeth 128 on one of the arms 119 overlap with the teeth 130 on the other arm 120. In one or more embodiments, the teeth 128, 130 may extend to any other suitable extent into the channel 126 (e.g., greater than approximately 50% of the width W of the channel 126 or less than approximately 50% of the width W of the channel 126). Although in the illustrated embodiment the teeth 128, 130 are flexible (e.g., the teeth 128, 130 are configured to bend toward the arms 119, 120), in one or more alternate embodiments, the teeth 128, 130 may be rigid or substantially rigid. Additionally, the teeth 128, 130 may be either integrally formed as a single unit with the arms 119, 120, respectively, or the teeth 128, 130 may be separately formed and coupled to the arms 119, 120, respectively, by any suitable manufacturing process or technique, such as, for instance, bonding or adhering. Additionally, in the illustrated embodiment, the teeth 128, 130 are angled toward the base wall 118 of the mount 102.

In one or more embodiments, the mounts 102 may be configured to be detachably coupled to the advertising article 103 by any other suitable mechanism, such as, for instance, a spring-loaded clamp, removable adhesive, one or more mechanical fasteners (e.g., pins and/or hook and loop type fasteners), a friction fit (i.e., an interference fit), or any combination thereof. Additionally, although in the illustrated embodiment each of the mounts 102 has the same configuration, in one or more alternate embodiments, the mounts 102 may have different configurations.

Still referring to the embodiment illustrated in FIGS. 3A and 3B, each of the spaced apart hooks 121 is an L-shaped member having a first member 132 extending perpendicular to the base wall 118 and a second member 133 extending from a free end 134 of the first member 132 parallel to the base wall 118 (e.g., each of the hooks 121 may include a horizontal member 132 and a vertical member 133 extending downward from the horizontal member 132). In the illustrated embodiment, the spacing of the hooks 121 corresponds to the spacing of the openings 108 in the rail 101 such that the hooks 121 on the mount 102 may be inserted into the desired openings 108 in the rail 101. In one or more embodiments, the hooks 121 may have any other suitable configuration for detachably engaging the rail 101, such as, for instance, button-shaped hooks or studs. In the illustrated embodiment, when the mounts 102 are detachably coupled to the rail 101, the horizontal member 132 of each of the hooks 121 extends through one of the openings 108 defined in the rail 101 and the vertical member 133 of each of the hooks 121 extends into the groove 116. Additionally, in the embodiment illustrated in FIGS. 1A and 1B, when the mounts 102 are coupled to the rail 101, the base wall 118 of the mount 102 abuts the outer surface 112 of the rail 101. The mounts 102 may include any suitable number of hooks 121 depending, for instance, on the size of the mount 102 and the size of the advertising article 103, such as, for instance, from one to six hooks 121.

A method of detachably coupling an advertising article 103, 103', and/or 103" to an electronic visual display device 104 (e.g., a television) located in a commercial establishment according to one embodiment of the present disclosure will now be described. In one embodiment, the method includes a task of breaking the rail 101 along one of the break lines 109 such that the rail 101 fits along one of the sides of the frame 105 of the electronic visual display device 104 to which it is desired to couple the advertising article 103, 103', and/or 103" (e.g., the length L of the rail 101 after being broken along one of the break lines 109 is substantially the same length as the side of the frame 105 of the electronic visual display device 104 or is shorter than the length of the side of the frame 105 of the electronic visual display device 104). If the original size of the rail 101 fits along the side of the frame 105 of the electronic visual display device 104 to which is it desired to couple the advertising article 103, 103', and/or 103", the method may not include the task of breaking the rail 101 along one of the break lines 109. Additionally, in one or more embodiments, the length L of the rail 101 may be longer than the side of the frame 105 of the electronic visual display device 104.

The method also includes a task of coupling the rail 101 to the electronic visual display device 104. In one embodiment, the task of coupling the rail 101 to the electronic visual display device 104 includes removing the protective film layer 115 covering the layer of adhesive 114 and a task of pressing the layer of adhesive 114 on the rail 101 against the side of the frame 105 of the electronic visual display device 104 to couple the rail 101 to the frame 105 of the electronic visual display device 104.

The method also includes a task of attaching one or more mounts 102 to the rail 101. To couple one of the mounts to the rail 101, the L-shaped hook 121 on the mount 102 is inserted into the desired opening 108 in the rail 101 based on the desired position of the mount 102 along the rail 101 and then the mount 102 is slid downward until the vertical member 133 of the hook 121 extends below the desired opening 108 and into the groove 116 in the inner surface 113 of the rail 101. The groove 116 is configured to retain the vertical member 133 of the hook 121 and thereby prevent the mount 102 from inadvertently disengaging the rail 101. Additionally, the groove 116 is configured to prevent the hook 121 on the mount 102 from contacting the frame 105 of the electronic visual display device 104, which could prevent the hook 121 on the mount 102 from properly engaging the rail 101. When the one or more mounts 102 are coupled to the rail 101, the base wall 118 of the mount 102 abuts the outer surface 112 of the rail 101. To detach the mount 102 from the rail 101 (e.g., to relocate the mount 102 along the rail 101 or to detach the advertising article 103, 103', and/or 103" from the electronic visual display device 104), the mount 102 may be lifted up and then the hook 121 may be withdrawn through the opening 108 in the rail 101. Although FIGS. 1A and 1B depict four mounts 102 detachably coupled to the rail 101, in one or more embodiments, the method may including attaching any other suitable number of mounts 102 to the rail 101, such as, for instance, from one to eight mounts 102. The number of mounts 102 may be selected, for instance, based on the size and weight of the advertising article 103, 103', and/or 103" and/or the number of advertising articles 103, 103', and/or 103" that are intended to be detachably coupled to the mounts 102.

The method also includes a task of detachably coupling the one or more advertising articles 103, 103', and/or 103" to the one or more mounts 102. In one embodiment, the advertising article 103, 103', and/or 103" may be coupled to each of the mounts 102 by sliding an edge of the advertising article 103, 103', and/or 103" into the channel 126 defined between the arms 119, 120 of the mount 102. For instance, in one embodiment, an edge of the advertising article 103, 103', and/or 103" may be pressed into the channel 126 from the outer free ends 124, 125 of the arms 119, 120 toward the inner ends 122, 123 of the arms 119, 120. In one embodiment, as the edge of the advertising article 103, 103', and/or 103" is pressed into the channel 126 from the outer free ends 124, 125 of the arms 119, 120 toward the inner ends 122, 123 of the arms 119, 120, the teeth 128, 130 on the mount 102 are deflected (e.g., bent) inward toward the base wall 118 of the mount 102. Additionally, in one or more embodiments, the inwardly deflected teeth 128, 130 are configured to resist movement of the advertising article 103, 103', and/or 103" out of the channel 126 and thereby prevent inadvertent detachment of the advertising article 103, 103', and/or 103" from the mount 102 (e.g., the inwardly deflected teeth 128, 130 are configured to resist movement of the advertising article 103, 103', and/or 103" in a direction away from the base wall 118 of the mount 102). In another embodiment, an edge of the advertising article 103, 103', and/or 103" may be slide up or down along the channel 126 to couple the one or more advertising articles 103, 103', and/or 103" to the one or more mounts 102. Although in one embodiment the task of coupling the one or more advertising articles 103, 103', and/or 103" to the one or more mounts 102 may be performed after the task of coupling the one or more mounts 102 to the rail 101, in one or more embodiments, the task of detachably coupling the one or more advertising articles 103, 103', and/or 103" to the one or more mounts 102 may be performed before the task of coupling the one or more mounts 102 to the rail 101. When the one or more advertising articles 103, 103', and/or 103" are coupled to one or more mounts 102, the teeth 128, 130 on the arms 119, 120 of the one or more mounts 102 engage the advertising article 103, 103', and/or 103" to retain the advertising article 103, 103', and/or 103" in the channel 126. One or more of the advertising articles 103, 103', and/or 103" may be detached from the one or more mounts 102, for instance, to replace the advertising article 103, 103', and/or 103" with another advertising article 103, 103', and/or 103" having different advertising content 107, 107', 107", by sliding the advertising article 103, 103', and/or 103" up or down along the channel 126 until the advertising article 103, 103', and/or 103" is removed from the channel 126.

In the illustrated embodiment, when the one or more advertising articles 103, 103', and/or 103" are detachably coupled to the one or more mounts 102, the mounts 102 are detachably coupled to the rail 101, and the rail 101 is coupled to the side of the frame 105 of the electronic visual display device 104, the one or more advertising articles 103, 103', and/or 103" are parallel or substantially parallel with the display area 107 of the electronic visual display device 104.

Depending on the position of the rail 101 relative to the electronic visual display device 104 after the task of coupling the rail 101 to the side of the frame 105 of the electronic visual display device 104, in one or more embodiments, one or more of the advertising articles 103, 103', and/or 103" may be co-planar or substantially co-planar with the display area 107 of the electronic visual display device 104. In one or more embodiments, one or more of the advertising articles 103, 103', and/or 103" may be parallel or substantially parallel with the display area 107 of the electronic visual display device 104 but one or more of the advertising articles 103, 103', and/or 103" may be non-planar with the display area 107 (e.g., one or more of the advertising articles 103, 103', and/or 103" may be recessed or project in front of the display area 107 of the electronic visual display device 104). Additionally, in one or more alternate embodiments, depending on the configuration of the mounts 102, when the one or more advertising articles 103, 103', and/or 103" are detachably coupled to the one or more mounts 102, one or more of the advertising articles 103, 103', and/or 103" (or a portion thereof) may not be parallel with the display area 107 of the electronic visual display device 104 (e.g., one or more of the advertising articles 103, 103', and/or 103" may be canted forward or rearward relative to the display area 107 of the electronic visual display device 104). Additionally, although in the illustrated embodiment the one or more advertising articles 103, 103', and/or 103" are planar or substantially planar members, in one or more alternate embodiments one or more of the advertising articles 103, 103', and/or 103" may have one or more non-planar features.

In one or more alternate embodiments, depending on the configuration of the mounts 102, the method may include a task of coupling the one or more advertising articles 103, 103', and/or 103" to the one or more mounts 102 by any other suitable process or technique, such as, for instance, by clamping the one or more advertising articles 103, 103', and/or 103" to the one or more mounts 102, by adhering the one or more advertising articles 103, 103', and/or 103" to the one or more mounts 102, and/or by mechanically fastening the one or more advertising articles 103, 103', and/or 103" to the one or more mounts 102 (e.g., pinning the one or more advertising articles 103, 103', and/or 103" to the one or more mounts 102 or detachably coupling the one or more advertising articles 103, 103', and/or 103" to the one or more mounts 102 with hook and loop type fasteners).

Additionally, in one or more embodiments, the method may not include the task of coupling the rail 101 to the frame 105 of the electronic visual display device 104. For instance, in one or more alternate embodiments, the method may include directly coupling the one or more mounts to the frame 105 of the electronic visual display device 104 by any suitable technique, such as, for instance, adhering, mechanically fastening (e.g., with hook and loop type fasteners), or combinations thereof. Additionally, although in one or more embodiment the method includes coupling the one or more mounts 102 to the side of the frame 105 of the electronic visual display device 104, in one or more alternate embodiments, the method may include coupling the one or more mounts 102 to any other suitable portion of the electronic visual display device 104. For instance, in one or more embodiments, the method may include coupling one or more mounts to a rear side of the electronic visual display device 104. The mounts may be configured such that when the one or more mounts are coupled to the rear side of the electronic visual display device 104, the one or more mounts extend around to one or more of the sides of the frame 105 of the electronic visual display device 104, and when the one or more advertising articles 103, 103', and/or 103" are coupled to the one or more mounts, the one or more advertising articles 103, 103', and/or 103" are adjacent to one or more sides of the electronic visual display device 104. Furthermore, in one or more embodiments, the method may include detachably coupling the one or more advertising articles 103, 103', and/or 103" to a separate frame that is configured to accommodate (e.g., house) the electronic visual display device 105. For instance, in one or more embodiments, the method may include coupling the rail 101 and/or one or more of the mounts 102 to the separate frame, detachably coupling one or more of the advertising articles 103, 103', and/or 103" to the one or more mounts 102, and inserting the electronic visual display 104 into the frame such that the frame surrounds the electronic visual display device 104. Additionally, in one or more embodiments, the separate frame that is configured to accommodate the electronic visual display device 104 may be pre-formed with one or more mounts 102 configured to be detachably coupled to the one or more advertising articles 103, 103', and/or 103".

The apparatuses and methods of the present disclosure are not limited to advertising in establishments selling consumables (e.g., food and/or beverages) or advertising in commercial establishments broadcasting programs (e.g., sporting events) to attract patrons. Instead, in one or more embodiments, the apparatuses and methods of the present disclosure may be used to advertise in any other suitable setting or establishment, such as, for instance, in retail establishments offering consumer goods (e.g., electronic goods or home supply goods) for sale, at trade shows (e.g., at trade shows booths), in offices (e.g., to display personal and/or work-related information on a computer monitor or other electronic visual display), or grocery stores (e.g., as point of sale displays in grocery stores).

While this invention has been described in detail with particular references to embodiments thereof, the embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention. Although relative terms such as "horizontal," "vertical," "upper," "lower," "inner," "outer" and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art. Moreover, the tasks described above may be performed in the order described or in any other suitable sequence. Additionally, the methods described above are not limited to the tasks described. Instead, for each embodiment, one or more of the tasks described above may be absent and/or additional tasks may be performed.

Furthermore, as used herein, when a component is referred to as being "on" or "coupled to" another component, it can be directly on or attached to the other component or intervening components may be present therebetween.

What is claimed is:

1. A method of advertising, comprising:
   coupling a first mount to an electronic visual display device located in a commercial establishment; and
   detachably coupling a first advertising article to the first mount, wherein, when the first advertising article is detachably coupled to the electronic visual display device by the first mount, the first advertising article is adjacent to the electronic visual display device, wherein the first advertising article comprises first advertising content, and wherein the method further comprises detaching the first advertising article from the first mount and detachably coupling a second advertising article to the first mount, the second advertising article comprising second advertising content different than the first advertising content, and wherein the detaching the first advertising article from the first mount and the detachably coupling the second advertising article to the first mount corresponds to a change in display content displayed on the electronic visual display device.

2. The method of claim 1, wherein, when the first advertising article is detachably coupled to the electronic visual display device, the first advertising article extends along at least a portion of a side of the electronic visual display device.

3. The method of claim 1, further comprising:
coupling a rail to a side of a frame extending peripherally around a display area of the electronic visual display device, the rail comprising a plurality of attachment points; and
coupling the mount to at least a first one of the plurality of attachment points on the rail.

4. The method of claim 3, further comprising:
coupling a second mount to at least a second one of the plurality of attachment points on the rail; and
detachably coupling a second advertising article to the second mount.

5. The method of claim 4, wherein advertising content contained on the first advertising article is different from advertising content contained on the second advertising article.

6. The method of claim 3, further comprising breaking the rail along one of a plurality of break lines defined in the rail such a length of the side of the rail is at least as long as a length of the frame.

7. The method of claim 1, wherein, when the first advertising article is detachably coupled to the electronic visual display device, the advertising article is substantially parallel with a display area of the electronic visual display device.

8. The method of claim 1, wherein, when the first advertising article is detachably coupled to the electronic visual display device, the advertising article is substantially co-planar with a display area of the electronic visual display device.

9. The method of claim 1, further comprising directly mounting the first mount to the electronic visual display device.

10. The method of claim 9, wherein the direct mounting of the first mount to the electronic visual display device comprises at least one of mechanical fastening or adhering the first mount to the electronic visual display device.

11. The method of claim 1, wherein the coupling of the first mount to the electronic visual display device comprises coupling the first mount to a side of a frame extending peripherally around a display area of the electronic visual display device.

12. The method of claim 1, wherein the coupling of the first mount to the electronic visual display device comprises coupling the first mount to a rear surface of the electronic visual display device.

13. The method of claim 1, wherein the advertising article comprises a printed medium.

14. The method of claim 1, wherein the electronic visual display device comprises a plurality of electronic visual displays arranged in an array.

15. The method of claim 1, wherein advertising content on the first advertising article is related to a product offered for sale by the commercial establishment.

16. The method of claim 1, wherein the coupling the first mount to the electronic visual display device comprises directly coupling the first mount to the electronic visual display device.

17. A method of advertising, comprising:
detachably coupling a first advertising article to a first mount coupled to an electronic visual display device located in a commercial establishment, wherein, when the first advertising article is detachably coupled to the electronic visual display device by the first mount, the first advertising article is adjacent to the electronic visual display device, wherein the first advertising article comprises first advertising content, and wherein the method further comprises detaching the first advertising article from the first mount and detachably coupling a second advertising article to the first mount, the second advertising article comprising second advertising content different than the first advertising content, and wherein the detaching the first advertising article from the first mount and the detachably coupling the second advertising article to the first mount corresponds to a change in display content displayed on the electronic visual display device.

18. The method of claim 17, wherein the first mount is integrally formed with a frame of the electronic visual display device.

* * * * *